(12) United States Patent
Jeong et al.

(10) Patent No.: US 11,864,250 B2
(45) Date of Patent: *Jan. 2, 2024

(54) METHOD AND APPARATUS FOR SUPPORTING VARIOUS SERVICES IN WIRELESS COMMUNICATION SYSTEM

(71) Applicant: Samsung Electronics Co., Ltd., Suwon-si (KR)

(72) Inventors: Sangsoo Jeong, Suwon-si (KR); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,024

(22) Filed: Feb. 14, 2022

(65) Prior Publication Data

US 2022/0167439 A1 May 26, 2022

Related U.S. Application Data

(63) Continuation of application No. 16/900,736, filed on Jun. 12, 2020, now Pat. No. 11,252,769.

(30) Foreign Application Priority Data

Jun. 14, 2019 (KR) .................. 10-2019-0071117
Apr. 10, 2020 (KR) .................. 10-2020-0044347

(51) Int. Cl.
*H04W 64/00* (2009.01)
*H04W 76/12* (2018.01)
*H04W 60/06* (2009.01)

(52) U.S. Cl.
CPC .......... *H04W 76/12* (2018.02); *H04W 60/06* (2013.01)

(58) Field of Classification Search
None
See application file for complete search history.

(56) References Cited

U.S. PATENT DOCUMENTS

| 10,687,300 B2 | 6/2020 | Youn et al. |
| 2018/0376445 A1 | 12/2018 | Yoon et al. |

(Continued)

FOREIGN PATENT DOCUMENTS

| KR | 10-2019-0060667 A | 6/2019 |
| WO | 2018/097599 A1 | 5/2018 |

(Continued)

OTHER PUBLICATIONS

Huawei et al., "Corrections on some MM procedures", Change Request, 3GPP TSG-SA WG2 #133, May 13-17, 2019, S2-1905745, 12 pages.

(Continued)

*Primary Examiner* — Suhail Khan

(57) ABSTRACT

The disclosure relates to a $5^{th}$ generation (5G) or pre-5G communication system for supporting a data transmission rate higher than that of a $4^{th}$ generation (4G) system, such as long-term evolution (LTE). The disclosure provides a method for operating a terminal in a wireless communication system, the method including: performing communication with an access and mobility management function (AMF) in a first network; and transmitting a radio resource control (RRC) message including information on the AMF in a second network.

9 Claims, 13 Drawing Sheets

(56) References Cited

U.S. PATENT DOCUMENTS

2019/0200414 A1* 6/2019 Abraham .............. H04W 76/27
2019/0289493 A1    9/2019 Jeong et al.

FOREIGN PATENT DOCUMENTS

WO    2018231029 A1    12/2018
WO    2019076439 A1    4/2019

OTHER PUBLICATIONS

MediaTek Inc., et al., "Miscellaneous editorial corrections (capitalization, messages, procedures etc.)", Change Request, 3GPP TSG-SA2 #125, Jan. 21-26, 2018, S2-181471, 75 pages.
ZTE, "Proceeding Clean-ups of Term-Secondary RAT Data Usage Report", Change Request, 3GPP TSG RAN WG3 #103bis, Apr. 8-12, 2019, R3-191267, 32 pages.
ZTE, "Stage 2 Various Clarifications of Secondary RAT DVR Behaviors", Change Request, 3GPP TSG RAN WG3#104, May 13-17, 2019, R3-192336, 5 pages.
International Search Report dated Sep. 25, 2020 in connection with International Patent Application No. PCT/KR2020/007659, 3 pages.
Written Opinion of the International Searching Authority dated Sep. 25, 2020 in connection with International Patent Application No. PCT/KR2020/007659, 4 pages.
European Patent Office, "Supplementary European Search Report," dated Jul. 8, 2022, in connection with European Patent Application No. EP20823515.0, 6 pages.

* cited by examiner

METHOD AND APPARATUS FOR SUPPORTING VARIOUS SERVICES IN WIRELESS COMMUNICATION SYSTEM

CROSS-REFERENCE TO RELATED APPLICATIONS

This application is a continuation of application Ser. No. 16/900,736, now U.S. Pat. No. 11,252,769, which is based on and claims priority under 35 U.S.C. 119 to Korean Patent Application No. 10-2019-0071117, filed Jun. 14, 2019, and Korean Patent Application No. 10-2020-0044347, filed Apr. 10, 2020, in the Korean Intellectual Property Office, the disclosures of which are herein incorporated by reference in their entirety.

BACKGROUND

1. Field

The disclosure generally relates to a wireless communication system, and more particularly, to a method and apparatus for supporting various services by supporting mobility of a terminal in a wireless communication system.

2. Description of Related Art

To meet the demand for wireless data traffic having increased since deployment of $4^{th}$ generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Due to the development of various information technologies (ITs), network equipment has evolved into virtualized network functions (NFs) by applying virtualization technology thereto, and virtualized NFs are implemented in a form of software beyond physical limitations and thus may be installed/operated in various types of clouds or data centers (DCs). In particular, NFs can be freely scaled up or down, installed (initiated), or terminated according to service requirements, system capacity, and network load.

In order to support various services in these various network structures, network slicing technology has been introduced. Network slicing is a technology for logically configuring a network using a set of network functions (NFs) for supporting a specific service, and separating the network from other slices. One terminal may access two or more slices in the case of receiving various services.

The above information is presented as background information only to assist with an understanding of the disclosure. No determination has been made, and no assertion is made, as to whether any of the above might be applicable as prior art with regard to the disclosure.

SUMMARY

Based on the discussion as described above, the disclosure provides a method and apparatus for supporting various services by supporting mobility of a terminal in a wireless communication system.

In order to achieve the technical problem described above, various embodiments provide a method for operating a terminal in a wireless communication system. The method for operating a terminal includes: performing communication with an access and mobility management function (AMF) in a first network; and transmitting a radio resource control (RRC) message including information on the AMF in a second network.

Various embodiments provide an apparatus for a terminal in a wireless communication system. The apparatus for the terminal includes a transceiver, and at least one processor, wherein the at least one processor is configured to: perform communication with an access and mobility management function (AMF) in a first network; and transmit a radio resource control (RRC) message including information on the AMF in a second network.

According to various embodiments, the disclosure may provide a method and apparatus for supporting various services by supporting the mobility of a terminal in a wireless communication system.

Effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to a method and apparatus for supporting various services in a wireless communication system. Specifically, the disclosure describes a technology for supporting various services by supporting mobility of a terminal in a wireless communication system.

Hereinafter, in the disclosure, terms used to identify an access node, terms referring to network entities or network functions (NFs), terms referring to messages, terms referring to an interface between network entities, terms referring to various pieces of identification information, and the like are exemplified for convenience of explanation. Accordingly, the disclosure is not limited to the terms described below, and other terms indicating objects having equivalent technical meanings may be used.

Hereinafter, for convenience of explanation, the disclosure uses terms and names defined in the 3rd generation partnership project long term evolution (3GPP LTE) and the 5G standard. However, the disclosure is not limited by the terms and names, and can be applied to systems conforming to other standards.

Figure 1:
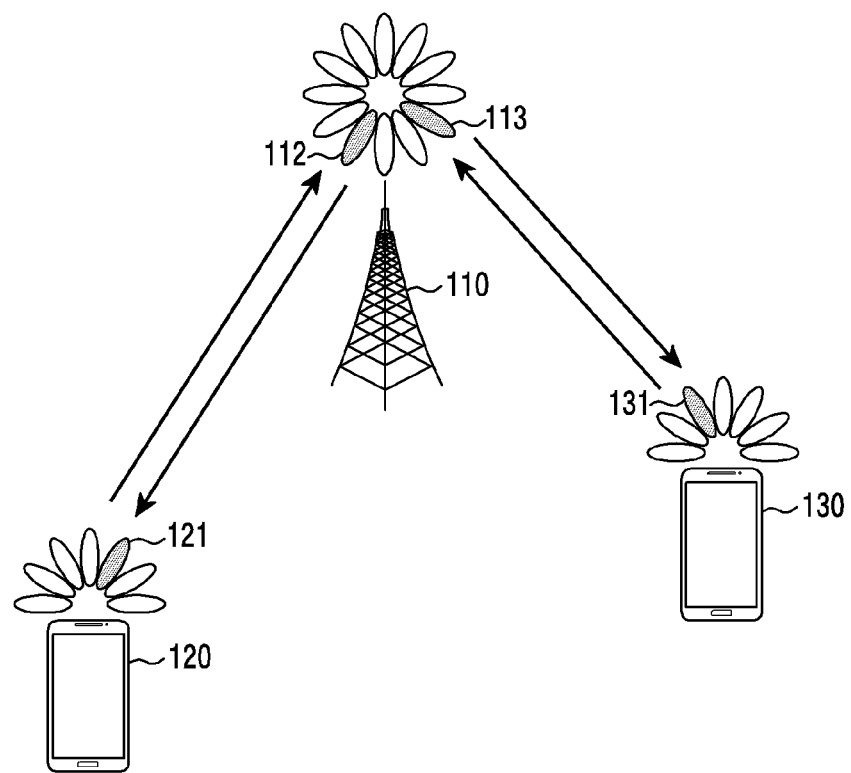
FIG. 1 illustrates a wireless communication system according to various embodiments.

FIG. 1 illustrates a wireless communication system according to various embodiments. FIG. 1 illustrates a base station 110, a terminal 120, and a terminal 130, as a part of nodes which use a wireless channel in a wireless communication system. FIG. 1 illustrates only one base station, but other base stations identical or similar to the base station 110 may be further included.

The base station 110 is a network infrastructure for providing wireless access to the terminals 120 and 130. The base station 110 includes a coverage which is defined as a predetermined geographic area based on a distance in which signal transmission is possible. The base station 110 may be referred to as, in addition to a base station, an "access point (AP)", an "eNodeB (eNB)", a "5th generation node (5G node)", a "wireless point", a "transmission/reception point (TRP)" or other terms having an equivalent technical meaning thereof.

Each of the terminal 120 and the terminal 130 is a device used by a user, and performs communication with the base station 110 through a wireless channel. In some cases, at least one of the terminal 120 and the terminal 130 may be operated without user involvement. That is, at least one of the terminal 120 and the terminal 130 is a device for performing machine type communication (MTC), and may not be carried by a user. Each of the terminal 120 and the terminal 130 may be referred to as, in addition to a terminal, a "user equipment" (UE), a "mobile station", a "subscriber station", or a "remote terminal", a "wireless terminal", a "user device", or other terms having an equivalent technical meaning thereof.

The base station 110, the terminal 120, and the terminal 130 may transmit or receive a radio signal in a mmWave band (e.g., 28 GHz, 30 GHz, 38 GHz, and 60 GHz). Here, in order to improve a channel gain, the base station 110, the terminal 120, and the terminal 130 may perform beamforming. Here, beamforming may include transmission beamforming and reception beamforming. That is, the base station 110, the terminal 120, and the terminal 130 may give directivity to a transmission signal or a reception signal. To this end, the base station 110 and the terminals 120, 130 may select serving beams 112, 113, 121, and 131 through a beam search or beam management procedure. After the serving beams 112, 113, 121, and 131 are selected, the subsequent communication is performed through a resource which is in a quasi- co-located (QCL) relationship with a resource having transmitted the serving beams 112, 113, 121, and 131.

Figure 2:
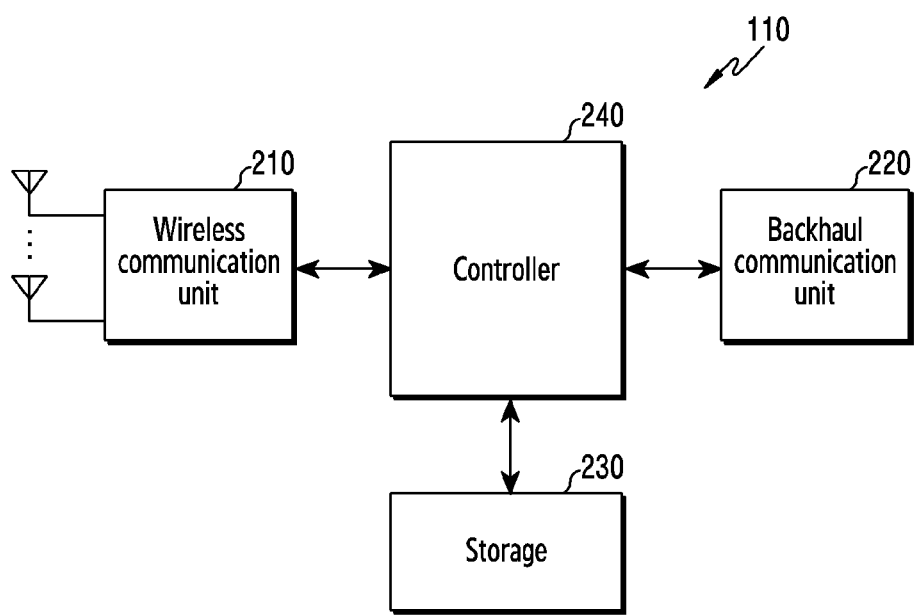
FIG. 2 illustrates a configuration of a base station in a wireless communication system according to various embodiments.

FIG. 2 illustrates a configuration of a base station in a wireless communication system according to various embodiments. The configuration illustrated in FIG. 2 may be understood as a configuration of the base station 110. The term "unit" or terms ending with suffixes "-er" and "-or" used in the following description refer to a unit which processes at least one function or operation, and may be implemented by hardware, software, or a combination of hardware and software.

Referring to FIG. 2, the base station 110 includes a wireless communication unit 210, a backhaul communication unit 220, a storage 230, and a controller 240.

The wireless communication unit 210 performs functions for transmitting or receiving signals through a wireless channel. For example, the wireless communication unit 210 performs a conversion function between a baseband signal and a bit string according to a physical layer standard of a system. For example, at the time of data transmission, the wireless communication unit 210 generates complex symbols by encoding and modulating a transmission bit string. In addition, at the time of data reception, the wireless communication unit 210 reconstructs a reception bit string by demodulating and decoding the baseband signal. In addition, the wireless communication unit 210 up-converts a baseband signal into a radio frequency (RF) band signal and transmits the signal through an antenna, and down-converts an RF band signal received through the antenna into a baseband signal.

To this end, the wireless communication unit 210 may include a transmission filter, a reception filter, an amplifier, a mixer, an oscillator, a digital to analog convertor (DAC), an analog to digital converter (ADC), and the like. Further, the wireless communication unit 210 may include a plurality of transmission/reception paths. Furthermore, the wireless communication unit 210 may include at least one antenna array configured by a plurality of antenna elements. In the hardware aspect, the wireless communication unit 210 may include a digital unit and an analog unit, and the analog unit may include a plurality of sub-units according to operating power, operating frequency, etc.

The wireless communication unit 210 transmits or receives signals as described above. Accordingly, all or part of the wireless communication unit 210 may be referred to as a "transmitter", a "receiver", a "transmitter/receiver", or a "transceiver". In addition, in the following description, transmission or reception performed through a wireless channel may include performing processing by the wireless communication unit 210 as described above.

The backhaul communication unit 220 provides an interface for performing communication with other nodes in a network. That is, the backhaul communication unit 220 converts a bit string, which is transmitted from the base station 110 to another node, for example, another access node, another base station, an upper node, and a core network, into a physical signal, and converts a physical signal, which is received from another node, into a bit string.

The storage 230 stores data, such as a basic program, an application program, and configuration information for the operation of the base station 110. The storage 230 may include a volatile memory, a nonvolatile memory, or a combination of a volatile memory and a nonvolatile memory. Then, the storage 230 provides the stored data at the request of the controller 240.

The controller 240 controls overall operations of the base station 110. For example, the controller 240 transmits or receives signals through the wireless communication unit 210 or the backhaul communication unit 220. In addition, the controller 240 records or reads data in and from the storage 230. In addition, the controller 240 may perform functions of a protocol stack required in the communication standard. To this end, the controller 240 may include at least one processor.

Figure 3:
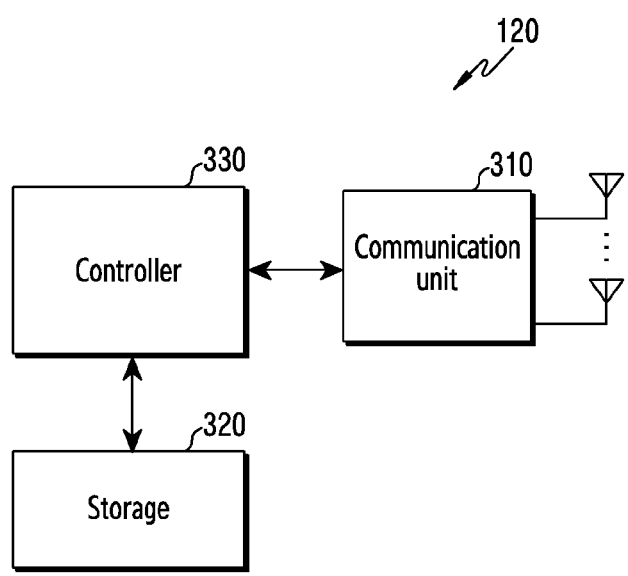
FIG. 3 illustrates a configuration of a terminal in a wireless communication system according to various embodiments.

FIG. 3 illustrates a configuration of a terminal in a wireless communication system according to various embodiments. The configuration illustrated in FIG. 3 may be understood as a configuration of the terminal 120. The term "unit" or terms ending with suffixes "-er" and "-or" used hereinafter refer to a unit which processes at least one function or operation, and may be implemented by hardware, software, or a combination of hardware and software.

Referring to FIG. 3, the terminal 120 includes a communication unit 310, a storage 320, and a controller 330.

The communication unit 310 performs functions for transmitting or receiving signals through a wireless channel. For example, the communication unit 310 performs a conversion function between a baseband signal and a bit string according to a physical layer standard of the system. For example, at the time of data transmission, the communication unit 310 generates complex symbols by encoding and modulating a transmission bit string. In addition, at the time of data reception, the communication unit 310 reconstructs the received bit string by demodulating and decoding the baseband signal. In addition, the communication unit 310 up-converts a baseband signal into an RF band signal and transmits the signal through an antenna, and down-converts an RF band signal received through the antenna into a baseband signal. For example, the communication unit 310 may include a transmission filter, a reception filter, an amplifier, a mixer, an oscillator, a DAC, and an ADC.

Further, the communication unit 310 may include a plurality of transmission/reception paths. Furthermore, the communication unit 310 may include at least one antenna array including a plurality of antenna elements. In the hardware aspect, the communication unit 310 may include a digital circuit and an analog circuit (e.g., a radio frequency integrated circuit (RFIC)). Here, the digital circuit and the analog circuit may be implemented in one package. In addition, the communication unit 310 may include a plurality of RF chains. Furthermore, the communication unit 310 may perform beamforming.

The communication unit 310 transmits or receives signals as described above. Accordingly, all or a part of the communication unit 310 may be referred to as a "transmitter", a "receiver," a "transmitter/receiver", or a "transceiver". In addition, in the following description, transmission and reception performed through a wireless channel may include performing processing which is performed by the communication unit 310 as described above.

The storage 320 stores data, such as a basic program, an application program, and configuration information for the operation of the terminal 120. The storage 320 may include a volatile memory, a nonvolatile memory, or a combination of a volatile memory and a nonvolatile memory. Then, the storage 320 provides the stored data at the request of the controller 330.

The controller 330 controls overall operations of the terminal 120. For example, the controller 330 transmits or receives signals through the communication unit 310. In addition, the controller 330 records or reads data in or from the storage 320. In addition, the controller 330 may perform functions of a protocol stack required by the communication standard. To this end, the controller 330 may include at least one processor or microprocessor, or may be a part of the processor. Also, a part of the communication unit 310 and the controller 330 may be referred to as a communication processor (CP).

Figure 4:
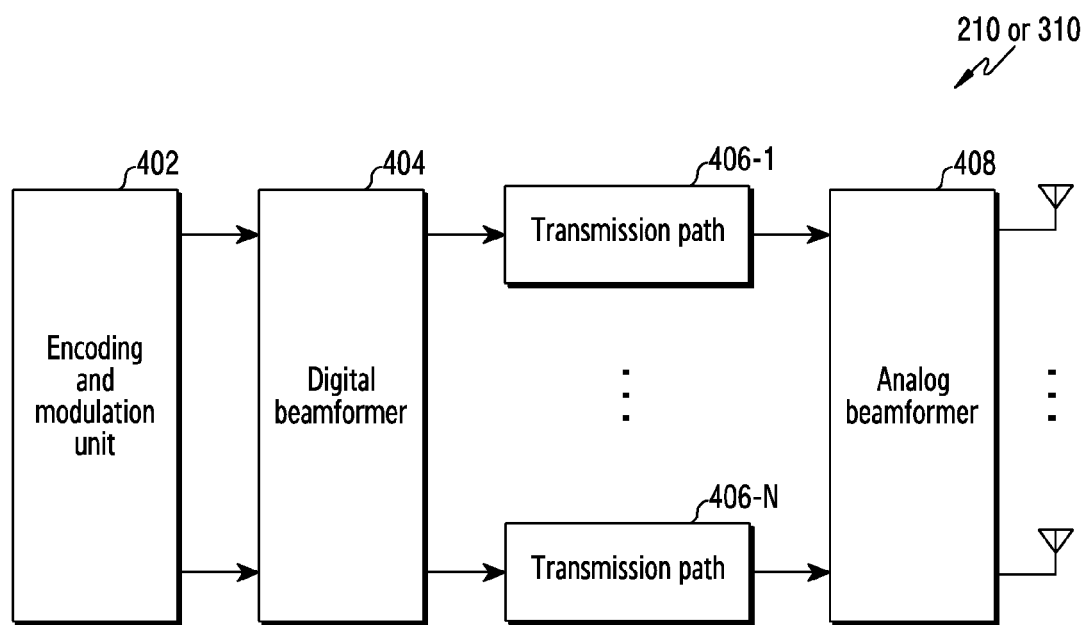
FIG. 4 illustrates a configuration of a communication unit in a wireless communication system according to various embodiments.

FIG. 4 illustrates a configuration of a communication unit in a wireless communication system according to various embodiments. FIG. 4 illustrates an example of a detailed configuration of the wireless communication unit 210 of FIG. 2 or the communication unit 310 of FIG. 3. Specifically, FIG. 4 illustrates elements for performing beamforming, as a part of the wireless communication unit 210 of FIG. 2 or as a part of the communication unit 310 of FIG. 3.

Referring to FIG. 4, the wireless communication unit 210 or the communication unit 310 includes an encoding and modulation unit 402, a digital beamformer 404, a plurality of transmission paths 406-1 to 406-N, and an analog beamformer 408.

The encoding and modulation unit 402 performs channel encoding. In order to perform channel encoding, at least one of a low density parity check (LDPC) code, a convolution code, and a polar code may be used. The encoding and modulation unit 402 generates modulation symbols by performing constellation mapping.

The digital beamformer 404 performs beamforming of a digital signal (e.g., modulation symbols). To this end, the digital beamformer 404 multiplies the modulation symbols by beamforming weights. Here, the beamforming weights are used to change the magnitude and the phase of the signal, and may be referred to as a "precoding matrix", a "precoder", or the like. The digital beamformer 404 outputs the digital-beamformed modulation symbols via the plurality of transmission paths 406-1 to 406-N. Here, according to a multiple-input multiple-output (MIMO) transmission scheme, the modulation symbols may be multiplexed, or the same modulation symbols may be provided via the plurality of transmission paths 406-1 to 406-N.

The plurality of transmission paths 406-1 to 406-N convert the digital-beamformed digital signals into analog signals. To this end, each of the plurality of transmission paths 406-1 to 406-N may include an inverse Fast Fourier transform (IFFT) operation unit, a cyclic prefix (CP) inserter, a DAC, and an up-converter. The CP inserter is for an orthogonal frequency division multiplexing (OFDM) scheme, and may be excluded when another physical layer scheme (e.g., filter bank multi-carrier (FBMC)) is applied. That is, the plurality of transmission paths 406-1 to 406-N provide independent signal processing processes to a plurality of streams generated through digital beamforming. However, some of elements of the plurality of transmission paths 406-1 to 406-N may be used in common according to the implementation scheme.

The analog beamformer 408 performs beamforming of analog signals. To this end, the digital beamformer 404 multiplies the analog signals by beamforming weights. Here, the beamforming weights are used to change the magnitude and the phase of a signal.

Figure 5:
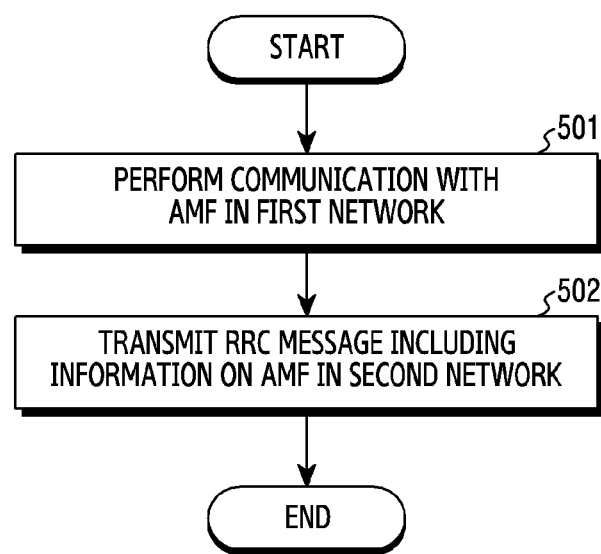
FIG. 5 is a flowchart illustrating a terminal operation in a wireless communication system according to various embodiments.

FIG. 5 is a flowchart illustrating a terminal operation in a wireless communication system according to various embodiments. FIG. 5 illustrates a method for operating a terminal.

Referring to FIG. 5, in operation 501, the terminal performs communication with an access and mobility management function (AMF) in a first network. According to an embodiment, the AMF is selected by considering a network slice, which is used by the terminal in the first network.

In operation 502, the terminal transmits a radio resource control (RRC) message including information on the AMF in a second network. According to an embodiment, the RRC message includes a tracking area update (TAU) request or an initial access request in the second network.

According to various embodiments, the disclosure may further include: receiving, from an AMF, information of a network slice in a first network which is allowed to a UE; and generating an identifier of a dedicated core network (DCN) using the information of the network slice.

According to an embodiment, the information on the AMF includes an identifier of the AMF or an identifier of a dedicated core network (DCN), and the identifier of the DCN includes information of a network slice, which is used when the terminal moves from the first network to the second network. According to an embodiment, the information on the AMF includes an identifier of a mobility management entity (MME) or a temporary identifier of the UE.

Figure 6:
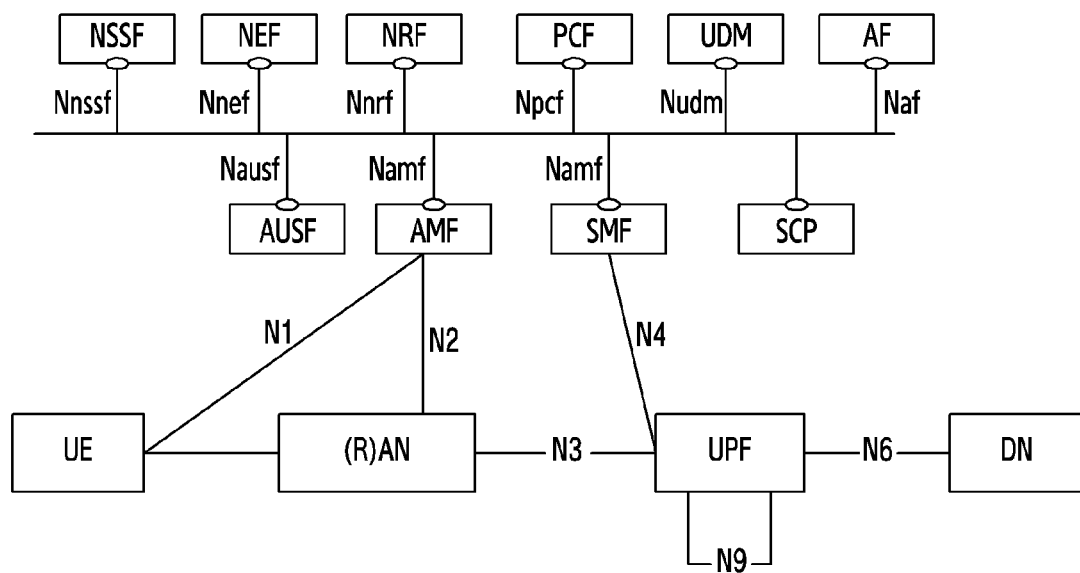
FIG. 6 illustrates an example of an SBA-based 5G system structure in a wireless communication system according to various embodiments.

FIG. 6 illustrates an example of an SBA-based 5G system structure in a wireless communication system according to various embodiments.

In order to support various services of 5G, a new system structure and a protocol are required, and 3GPP determines to introduce a new technology called service-based architecture (SBA). The main characteristics of the service-based architecture are to divide the functionalities of NFs, defined in the 3GPP standard, into service units, by considering the virtualization technology, introduction of cloud environment, and expansion of web-based services, and to use the HTTP/2 protocol in implementing the services.

Referring to FIG. 6, an access and mobility management function (AMF) is a network function (NF) for managing mobility and wireless network access to a UE. A session management function (SMF) is an NF for managing a session for the UE, and session information includes quality of service (QoS) information, charging information, and information about packet processing. A user plane function (UPF) is an NF for processing user plane traffic and is controlled by the SMF. Although not shown in FIG. 1, the 5G system may include an unstructured data storage network function (UDSF), and the UDSF is an NF for storing unstructured data, and may store or retrieve any type of data at the request of the NF. The functions and services provided by AMF are similar to functions and services of a mobility management entity (MME) in a 4G network, and functions of AMF and MME may be integrated with each other, or may be implemented or built in a way that the functions thereof are included in each other.

Meanwhile, a network may be built/operated in the form of a network slice in order to provide various services or to provide convenience of isolation or management/operation of a network for each service in a 5G/4G communication system. One network slice is a set of NF/NEs for configuring a network in order to provide communication services. The 5G-based network slice may include an AMF, an SMF, a UPF, a next generation radio access network (NG-RAN), and other network functions/network entities (NFs/NEs) interworking. The 4G-based network slice may include a mobility management entity (MME), a serving gateway (SGW), a packet data network gateway (PGW), and an evolved universal terrestrial radio access network (E-UTRAN), and other NFs/NEs interworking.

The level of isolation to be applied to each network slice may differ according to service requirements and operator policies. Network slices of some services types are completely isolated and thus information exchange with other network slices may be completely blocked, network slices of different service types may expose the minimal pieces of information, or other network slices of different types may expose all pieces of information. Since a network slice is understood as a concept of allocating a dedicated network to a specific service, the network slice and the dedicated network have similar meanings in the disclosure. In addition, in the case where units for realization of the concept of network slice are configured as network slice instances, the subject matter of the disclosure is equally applied. That is, the disclosure may apply the case where the network slice is to be replaced with a network slice instance.

Figure 7:
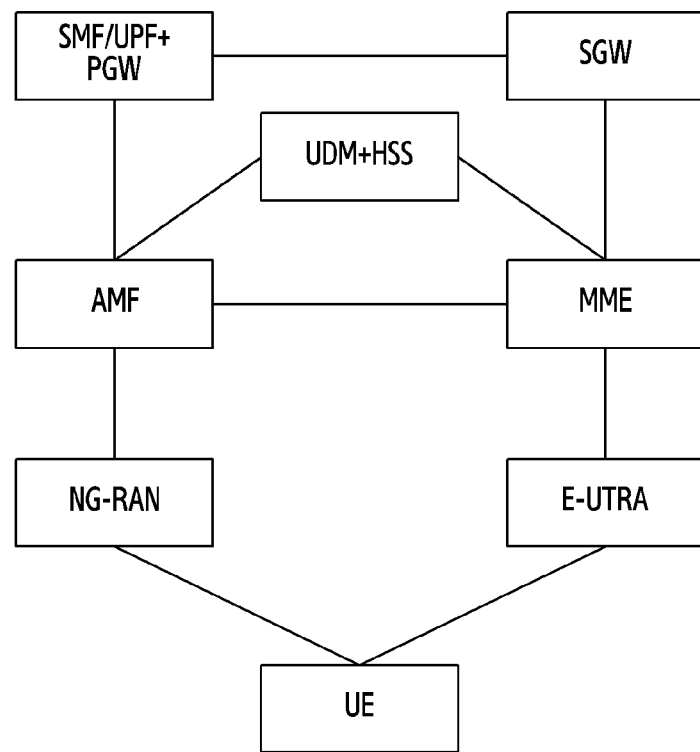
FIG. 7 illustrates an example of a network structure in a wireless communication system according to various embodiments.

FIG. 7 illustrates an example of a network structure in a wireless communication system according to various embodiments.

Referring to FIG. 7, an example of a structure for providing service continuity by linking 5G and 4G networks is illustrated. In order to control the same subscriber, unified data management (UDM) and a home subscriber subsystem (HSS) needs to be linked to each other, and SMF/UPF needs to support the function of PGW in order to support session continuity (such as maintaining an IP address). In addition, the AMF and the MME may exchange information for supporting UE mobility between 5G and 4G through an N26 interface.

Figure 8:
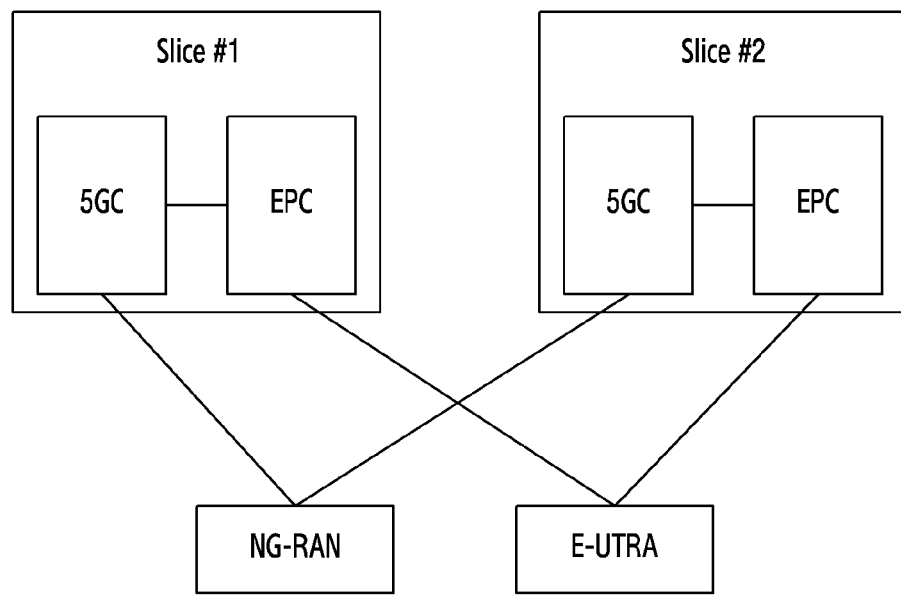
FIG. 8 illustrates a concept of a network slice, that is, a dedicated network, in a wireless communication system according to various embodiments.

FIG. 8 illustrates a concept of a network slice, that is, a dedicated network, in a wireless communication system according to various embodiments.

Referring to FIG. 8, an example in which each slice is completely isolated from each other is illustrated, and the example corresponds to an aspect in which each slice has the highest security level. That is, when 5G/4G interworking is supported in each slice, 5G and 4G networks in the slice may exchange information with each other, but information exchange with other slices may not occur. In the network construction described above, RAN (NR-RAN or E-UTRAN) may be shared for each slice.

In the network configuration described above, the UE may access a 5G network in slice #1 and receive a service, and then may shift to 4G. Here, status information (UE context) and security information (security context) for providing a communication service to a UE may be exchanged only inside the slice. However, if a base station, accessed by the UE, selects an evolve packet core (EPC) belonging to slice #2 other than an EPC belonging to slice #1, the EPC may not provide continuity for a communication service to the UE since the EPC may not receive UE information from a 5G core network (5GC), and the UE is in a state of not being registered in the corresponding operator network. In this case, since the service is temporarily unavailable to the user, the quality of service experienced by the user may deteriorate.

Figure 9:
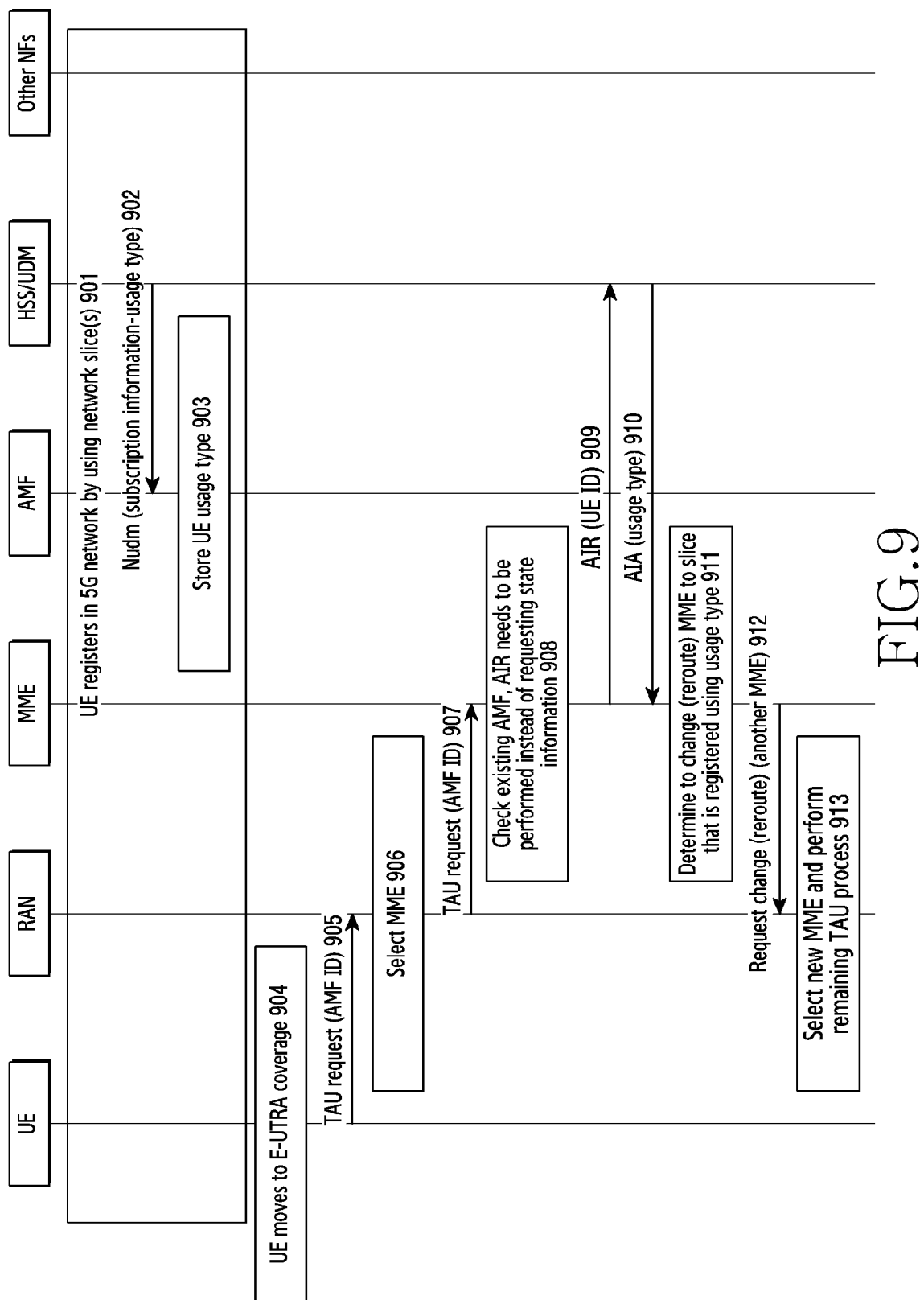
FIG. 9 illustrates an example of a process of supporting various services in a wireless communication system according to various embodiments.

FIG. 9 illustrates an example of a process of supporting various services in a wireless communication system according to various embodiments.

In operation 901, a UE performs a registration process in order to receive a service through a 5G network. Detailed operations of the UE, a RAN, and a core network follows the standard, and in this case, an AMF is selected by considering a network slice to be used by the UE.

During the registration process, in operation 902, if there is service/slice information (UE usage type) allocated to the UE in the 4G network, a server (UDM/HSS), which includes subscription information about a user, transmits, to the AMF, the subscription information of the UE (a user of the UE) having requested the registration, including the service/slice information (UE usage type).

In operation 903, the AMF stores the received UE usage type of the UE. The stored UE usage type is one of status information (UE context), and may be transferred to another AMF.

In operation 904, the UE shifts to a 4G network according to wireless conditions, service types, mobility, and the like. In operation 905, the UE transmits a request for receiving a service in a 4G network to an evolved packet core (EPC, 4G core) through E-UTRAN. Here, the UE transmits a tracking area update (TAU) request or an initial attach request according to an operation mode of the UE. The operation mode of the UE is determined according to whether the UE allows an attach state in which a protocol data unit session (PDU session) does not exist. A message relating to the TAU request or the initial access is included in a radio resource control (RRC) message transmitted by the UE to the E-UTRAN. The request message transmitted by the UE includes information capable of finding an AMF which has been previously serving the UE in the 5G network. The information may be transmitted via a mapped MME identifier or a temporary identifier assigned to the UE.

In operation 906, the E-UTRAN selects an MME for transferring the request (TAU or initial access) from the UE. Here, the E-UTRAN selects the MME using the information received in operation 903. Here, since the mapped MME information transferred by the UE may be information substantially indicating the AMF and may include insufficient information to find an MME associated with the AMF (that is, the MME and AMF belonging to the same slice), the E-UTRAN may select a third MME, that is, an MME that does not belong to the same slice.

In operation 907, the E-UTRAN transfers a non-access stratum (NAS) request, transmitted by the UE, to the selected MME. A message relating to the NAS request includes the identifier (or address) of the AMF which has been previously serving the UE.

In operation 908, the MME determines whether the AMF, which includes existing status information (UE context) of the UE, is capable of interworking with the MME itself or whether the MME and AMF belong to the same slice, using the identifier of the AMF included in the request message of the UE. If interworking is possible, the MME directly transmits a message (context request) requesting status information (UE context) about the UE to the AMF. If interworking is not possible, the MME transmits, to the UDM/HSS, a request for receiving additional information about the UE instead of requesting the status information (UE context) (indicated in operation 909).

Operation 909 corresponds to the case where the MME has difficulty in receiving status information (UE context) about the UE from the AMF, or to the case where the MMF cannot find the AMF associated with the MMF itself via the identifier transmitted by the UE. Here, before transmission of the status information (UE context) request, the MME requests additional information for determining whether it is necessary to transmit the request from the UE to another MME (i.e., belonging to a different slice/dedicated network) from the UDM/HSS. Here, the message used by the MME is an authentication information request (AIR), and in this case, the MME configures and transmits a flag explicitly requesting slice/dedicated network information (UE usage type) for a subscriber (UE).

In operation 910, the UDM/HSS makes a response to the MME according to the request, and the MME transmits, in response to the request, if the subscriber includes slice/dedicated network information (UE usage type), an authentication information answer (AIA) message including the slice/dedicated network information.

This process is to be performed in order to receive information for selecting an MME according to a slice/dedicated network structure rather than actually performing authentication for the UE. Accordingly, the MME may include, in the authentication information request (AIR) message, an indication indicating the request described above and accordingly, UDM/HSS may include only requested information, other than the authentication information, in the authentication information answer (AIA) message.

In operation 911, the MME determines whether it is necessary to process the request from the UE in another MME (i.e., another slice/dedicated network), using the information received from the UDM/HSS. Here, the MME may use, as configuration information, the address/identifier of the MME mapped to the specific UE usage type. Here, information of an MME (an MME group, an MME identifier, etc.) for processing the request from the UE is specified.

In operation 912, the MME transfers, to the E-UTRAN, a request indicating to transfer the request from the UE to another MME (or an MME group) selected in operation 911.

In operation 913, the E-UTRAN selects a new MME using the information transferred by the MME, and the subsequent operation performs the remaining of the tracking area update (TAU) or initial attach process.

Figure 10:
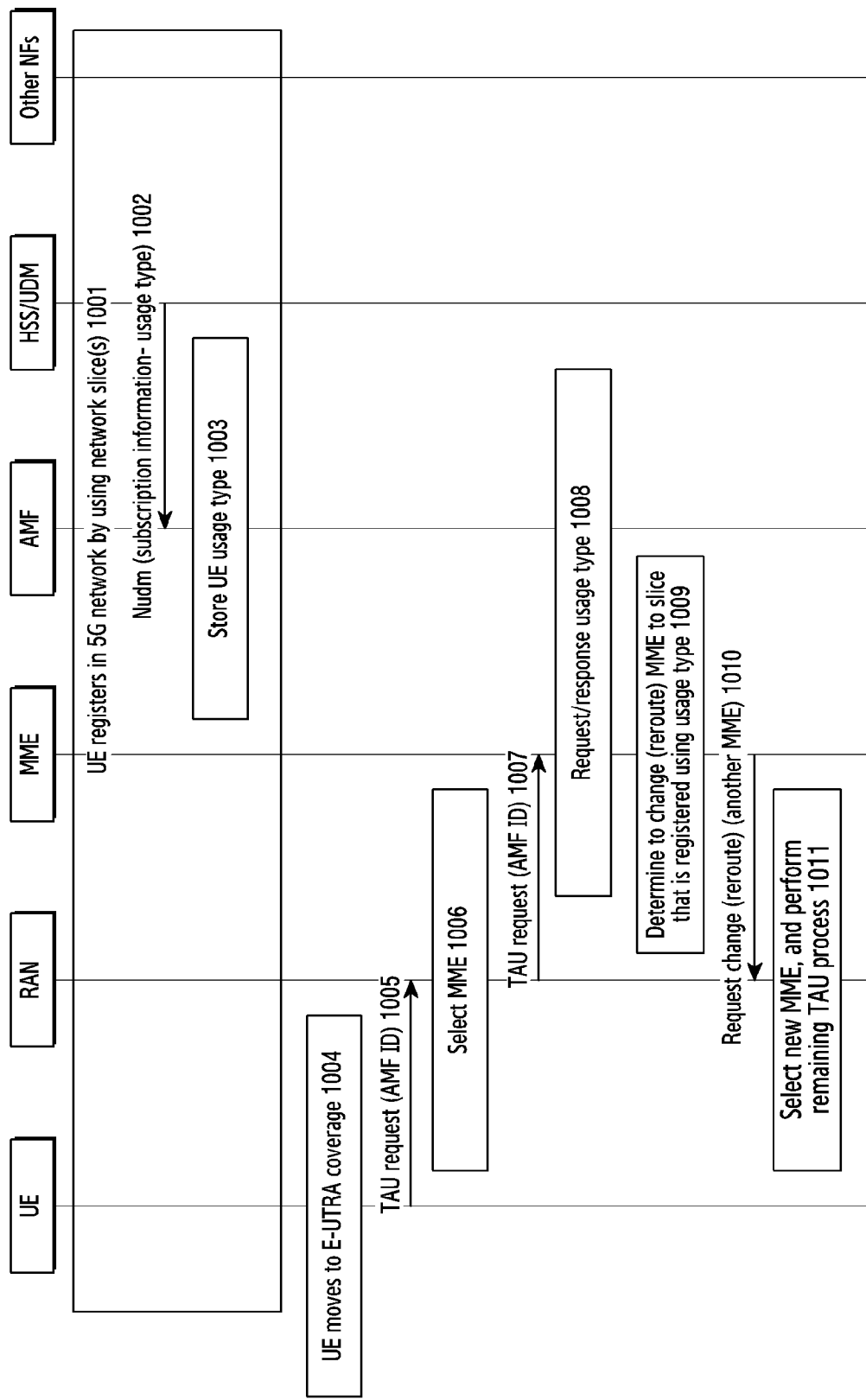
FIG. 10 illustrates an example of a process of supporting various services in a wireless communication system according to various embodiments.

FIG. 10 illustrates an example of a process of supporting various services in a wireless communication system according to various embodiments.

In operation 1001, a UE performs a registration process in order to receive a service through a 5G network. Detailed operations of the UE, a RAN, and a core network follow the standard, and in this case, an AMF is selected by considering a network slice to be used by the UE.

During the registration process, in operation 1002, if there is service/slice information (UE usage type) allocated to the UE in the 4G network, a server (UDM/HSS), which includes subscription information about a user, transmits, to the AMF, the subscription information of the UE (a user of the UE) having requested the registration, including the service/slice information (UE usage type).

In operation 1003, the AMF stores the received UE usage type of the UE. The stored UE usage type is one of the status information (UE context), and may be transferred to another AMF.

In operation 1004, the UE shifts to a 4G network according to wireless conditions, service types, mobility, and the like. In operation 1005, the UE transmits a request for receiving a service in the 4G network to an evolved packet core (EPC, 4G core) through E-UTRAN. Here, the UE transmits a tracking area update (TAU) request or an initial attach request according to an operation mode of the UE. The UE transmits a radio resource control (RRC) message, transmitted by the UE to the E-UTRAN, including the TAU request or the initial access request therein. The request message transmitted by the UE includes information capable of finding an AMF which has been previously serving the UE in the 5G network. The information may be transmitted via a mapped MME identifier or a temporary identifier assigned to the UE.

In operation 1006, the E-UTRAN selects an MME for transferring the request (tracking area update (TAU) or initial access) from the UE. Here, the E-UTRAN selects the MME using the information received in operation 1003. Here, since the mapped MME information, transferred by the UE, may be information substantially indicating the AMF and may include insufficient information to find an MME associated with the AMF (that is, the MME and AMF belong to the same slice), the E-UTRAN may select a third MME, that is, an MME that does not belong to the same slice.

In operation 1007, the E-UTRAN transfers an NAS request, transmitted by the UE, to the selected MME. A message relating to the NAS request includes the identifier (or address) of the AMF which has been previously serving the UE.

In operation 1008, the MME determines whether the AMF, which includes existing status information (UE context) of the UE, is capable of interworking with the MME itself or whether the MME and AMF belong to the same slice, using the identifier of the AMF included in the request message of the UE. If normal processing is possible since interworking of the MME and the AMF is possible and the MME and the AMF belong to the same slice, the MME directly transmits a message (context request) requesting status information (UE context) about the UE to the AMF. Otherwise, the MME needs to receive additional information from the AMF to determine whether it is necessary to transmit the request from the UE to another MME (i.e., belonging to a different slice/dedicated network). Here, a method is to be used in which the MME transfers a separate message or indication for receiving a UE usage type of the UE to the AMF, and in response thereto, the AMF notifies of the UE usage type. Another method is that if the MME transmits a status information (UE context) request message including the identifier (or address) of the MME itself, similar to normal processing, the AMF may determine that the MME having transmitted the message enables interworking with the AMF itself or that the MME and the AMF do not belong to the same slice. If transmission of the entire status information (UE context) according to the request from the MME is impossible, the AMF may transmit information for transferring the request to another MME. Here, the AMF may notify the MME of the UE usage type, and may induce the MME, which has made the request, to select another MME (or a MME group) corresponding to the UE usage type (indicated in operation 1009), otherwise, the AMF itself may select information of MME (or MME group) and notify of the selected information.

In operation 1010, the MME transmits, to the E-UTRAN, a request indicating to transfer a request from the UE to another MME (or an MME group) selected in operation 1009.

In operation 1011, the E-UTRAN selects a new MME using the information transferred by the MME, and the remaining of the tracking area update (TAU) or initial attach process is performed in subsequent operations.

Figure 11:
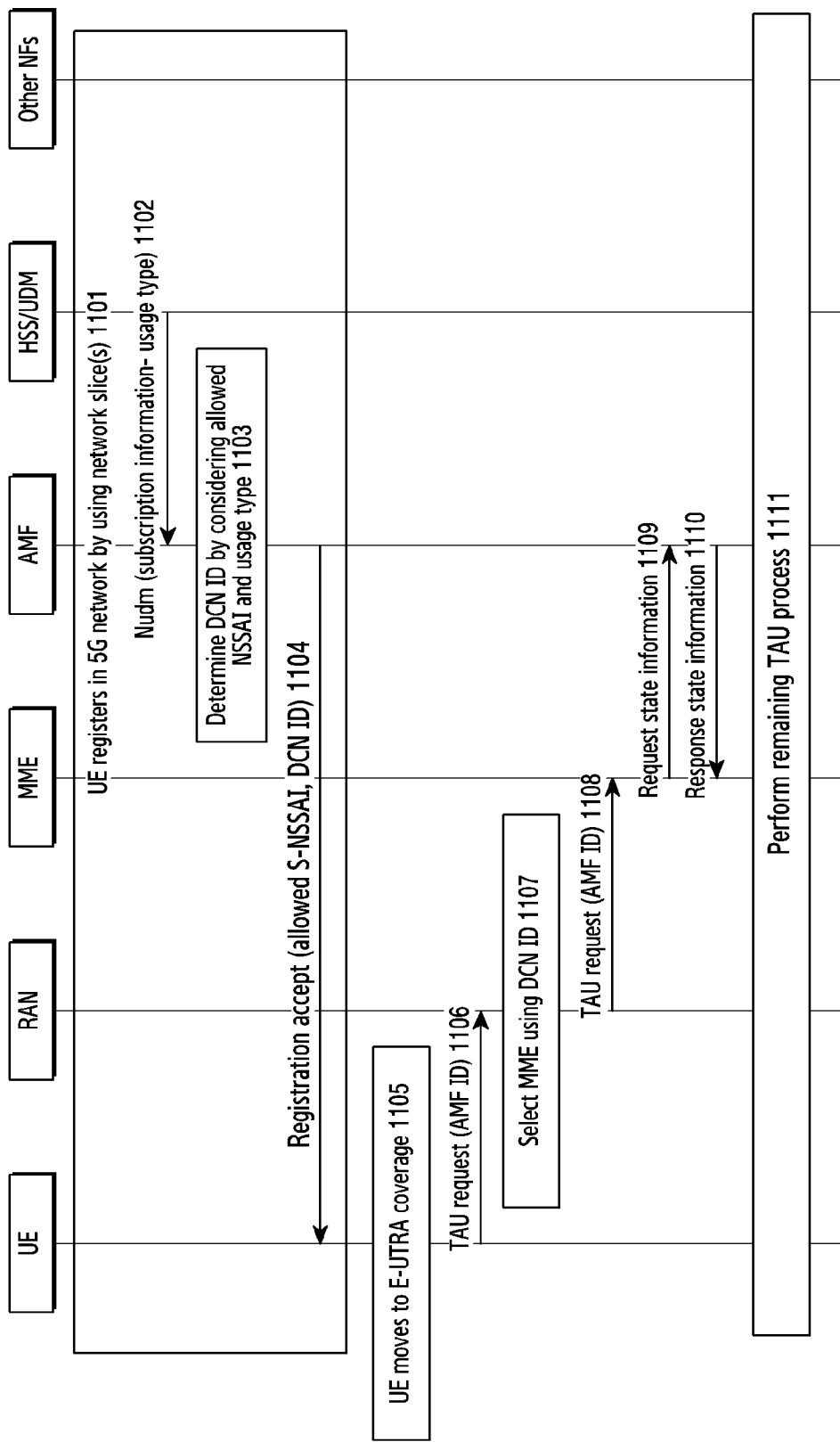
FIG. 11 illustrates an example of a process of supporting various services in a wireless communication system according to various embodiments.

FIG. 11 illustrates an example of a process of supporting various services in a wireless communication system according to various embodiments.

In operation 1101, a UE performs a registration process in order to receive a service through a 5G network. Detailed operations of a UE, a RAN, and a core network follow the standard, and in this case, an AMF is selected by considering a network slice to be used by the UE. During the above process, the UE may additionally include a capability of notifying the AMF of whether the UE itself requests a specific slice/dedicated network from the E-UTRAN using a dedicated core network identifier (DCN ID) in the 4G network, that is, a capability of notifying of whether the UE supports enhancements of dedicated core networks (eDECOR).

During the registration process, in operation 1102, if there is service/slice information (UE usage type) allocated to the UE in the 4G network, a server (UDM/HSS), which includes subscription information about a user, transmits, to the AMF, the subscription information of the UE (a user of the UE) having requested the registration, including the service/slice information (UE usage type) allocated to the UE.

In operation 1103, the AMF determines the slice/dedicated core network information (DCN ID) to be used for the UE at the time of moving to the 4G network. Here, in the case of determining the DCN ID, slice information allowed in the 5G network (allowed network slice selection assistance information, allowed NSSAI), a UE-usage type which is received via subscription information in operation 1102, and information configured for the AMF are considered. In addition, the AMF considers whether there is a subscribed DNN to which the 4G interworking is allowed, among the subscribed DNNs of the UE, based on the subscription information for the UE, and considers the capability of the UE having transmitted the request.

In operation 1104, the AMF transmits a registration accept message to the UE, and the message includes, if there is a slice allowed for the UE, the allowed slice information (allowed NSSAI) and the DCN ID determined in operation 1103. Here, the DCN ID may be configured in the form of mapping for each single network slice selection assistance information (S-NSSAI) included in the allowed slice information (allowed NSSAI), or may be transferred as one representative value for a UE rather than a value for each S-NSSAI.

In operation 1105, the UE shifts to a 4G network according to wireless conditions, service types, mobility, and the like. In operation 1106, the UE transmits a request for receiving a service in the 4G network to an evolved packet core (EPC, 4G core) through E-UTRAN. Here, the UE transmits a tracking area update (TAU) request or an initial attach request according to an operation mode of the UE. A message relating to the TAU request or the initial access request is included in a radio resource control (RRC) message transmitted by the UE to the E-UTRAN. The request message transmitted by the UE includes information capable of finding an AMF which has been previously serving the UE in the 5G network. The information may be transmitted via a mapped MME identifier or a temporary identifier assigned to the UE. In addition, the UE may transmit the RRC message including the DCN ID received in operation 1104.

In operation 1107, the E-UTRAN selects an MME for transferring the request (tracking area update (TAU) or initial access) from the UE. Here, the E-UTRAN selects the MME using the DCN ID, which is explicitly transmitted by the UE in operation 1105. If the MME selected using the DCN ID differs from the MME selected using a mapped MME identifier (or MME group identifier), the E-UTRAN may preferentially use the MME selected using the DCN ID.

In operation 1108, the E-UTRAN transfers an NAS request, transmitted by the UE, to the selected MME. A message relating to the NAS request includes the identifier (or address) of the AMF which has been previously serving the UE.

In operation 1109, the MME transmits a request for status information (UE context) to the AMF using the identifier of the AMF, included in the request message of the UE, and in operation 1110, the MME receives the status information (UE context) in response thereto. In operation 1107, since the MME belonging to the same slice/dedicated network as that of the AMF may be selected, a request for status information (UE context) may be successfully processed.

From operation 1111, the remaining of a tracking area update (TAU) or initial attach process is performed. During this process, the MME may compare information received from the AMF, information received from the UDM/HSS, and the DCN ID requested by the UE, and may perform verification of the request from the UE.

Figure 12:
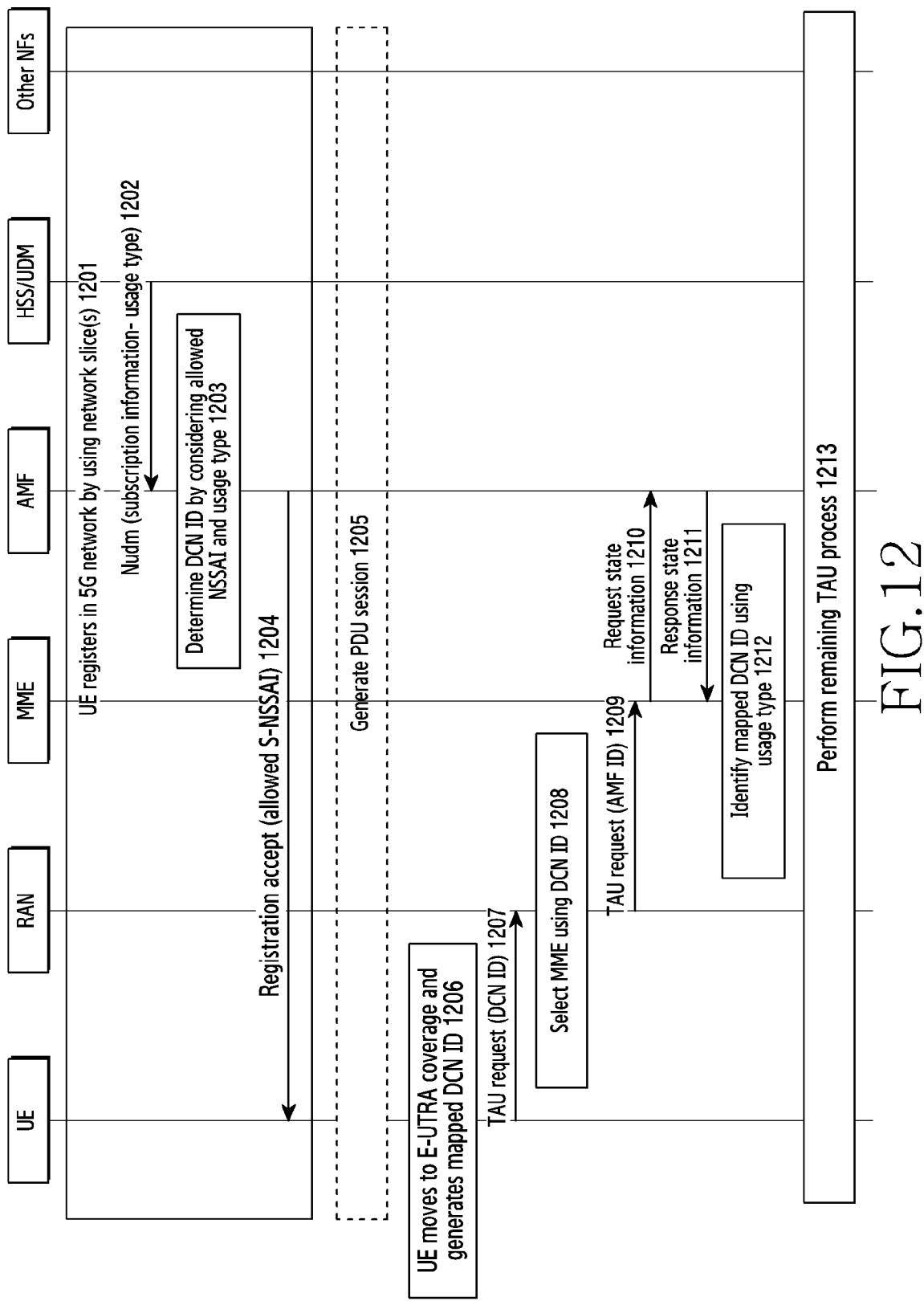
FIG. 12 illustrates an example of a process of supporting various services in a wireless communication system according to various embodiments.

FIG. 12 illustrates an example of a process of supporting various services in a wireless communication system according to various embodiments.

In operation 1201, a UE performs a registration process in order to receive a service through a 5G network. Detailed operations of a UE, a RAN, and a core network follow the standard, and in this case, an AMF is selected by considering a network slice to be used by the UE.

During the registration process, in operation 1202, if there is service/slice information (UE usage type) allocated to the UE in the 4G network, a server (UDM/HSS), which includes subscription information about a user, transmits, to the AMF, the subscription information of a UE (a user of the UE) having requested the registration, including the service/slice information (UE usage type).

In operation 1203, the AMF determines the slice/dedicated core network information (DCN ID) to be used for the UE at the time of moving to the 4G network. Here, in the case of determining the DCN ID, allowed slice information (allowed NSSAI) in the 5G network, a UE-usage type which is received via subscription information in operation 1102, and information configured for the AMF are considered. In addition, the AMF considers whether there is a subscribed DNN to which the 4G interworking is allowed, among subscribed DNNs of the UE, based on the subscription information for the UE, and considers the capability of the UE having transmitted the request.

In operation 1204, the AMF transmits a registration accept message to the UE, and the message includes, if there is a slice allowed for the UE, the allowed slice information (allowed NSSAI).

In operation 1205, the UE may generate a protocol data unit (PDU) session according to the allowed slice information and traffic condition of the UE itself.

In operation 1206, the UE shifts to a 4G network according to wireless conditions, service types, mobility, and the like. In operation 1207, the UE transmits a request for receiving a service in the 4G network to an evolved packet core (EPC, 4G core) through E-UTRAN. Here, the UE transmits a tracking area update (TAU) request or an initial attach request according to an operation mode of the UE. A message relating to the TAU request or the initial access request is included in a radio resource control (RRC) message transmitted by the UE to the E-UTRAN. The request message transmitted by the UE includes information capable of finding an AMF which has been previously serving the UE in the 5G network. The information may be transmitted via a mapped MME identifier or a temporary identifier assigned to the UE.

During the process described above, the UE may generate a DCN ID according to whether or not a slice is used in 5G network of the UE itself, and include the generated DCN ID in the RRC message and transmit the same. In the current embodiment, since the UE does not explicitly receive the DCN ID from the network, the UE generates a mapped DCN ID using slice information.

The UE may generate the mapped DCN ID by copying only a slice/service type (SST) portion in the slice information (S-NSSAI) used by the UE itself, or may generate the DCN ID by copying 16 bits in the S-NSSAI. If the UE uses a plurality of slices, selection of S-NSSAI, which is to be used by the UE at the time of generating the mapped DCN ID may differ according to UE implementation.

In operation 1208, the E-UTRAN selects an MME for transferring a request (tracking area update (TAU) or initial access) from the UE. Here, the E-UTRAN selects the MME using the DCN IN, which is explicitly transmitted by the UE in operation 1207. If the MME selected using the DCN ID differs from the MME selected using a mapped MME identifier (or MME group identifier), the E-UTRAN may preferentially use the MME selected using the DCN ID. If it is not possible to select the MME associated with the E-UTRAN, via the DCN ID transmitted by the UE, the MME selected using the MME identifier (or MME group identifier) mapped to the MME may be preferentially used.

In operation 1209, the E-UTRAN transfers an NAS request, transmitted by the UE, to the selected MME. A message relating to the NAS request includes the identifier (or address) of the AMF which has been previously serving the UE.

In operation 1210, the MME transmits a request for status information (UE context) to the AMF using the identifier of the AMF, included in the request message of the UE, and in operation 1211, the MME receives the status information (UE context) in response thereto.

In operation 1212, the MME may compare information received from the AMF, information received from the UDM/HSS, and the DCN ID requested by the UE, and may perform verification of the request from the UE.

From operation 1213, the remaining process of tracking area update (TAU) or initial attach is performed.

Meanwhile, various embodiments propose a technology which enables a user plane function (UPF) and a session management function (SMF), which support 5G-4G interworking in a network in which a 5G core network (5GC) is introduced, to be used in a 4G dedicated UE. According to an embodiment, the SMF supports a function of a packet data network gateway control plane (PGW-C), and the UPF supports a function of a packet data network gateway user plane (PGW-U). In this case, a target UE is a UE supporting 4G (LTE/evolved packet system (EPS)) (that is, a UE supporting only EPC NAS), and the subscription information needs to be configured to allow access to 5G system (5GS). The access allowance to 5GS may be specifically expressed such that 5GC is not included in core network type restriction among subscription information.

The UE performs an access request (tracking area update (TAU) or initial attach) through the E-UTRAN, and the MME having received the access request receives, from the UDM/HSS, subscription information including the 5GS access allowance for the UE. Here, in the process of generating/adding a PDN connection, in a network configuration in which 4G service through SMF/UPF is allowed, the MME may select the SMF/UPF in a PGW selection process for a 4G UE.

Here, since session management function+packet data network gateway-control (SMF+PGW-C) is a device for 5G, but the UE supports only 4G, new parameters newly added for 5G need not be added to parameters transmitted to the UE. Further, unlike the 5G UE, the 4G UE itself cannot generate the PDU session ID, but the PDU session ID needs to be generated for the operation of the SMF/UPF. Therefore, the SMF/UPF generates a PDU session ID, instead of the UE, only when the 4G UE is connected, and uses the PDU session ID for interworking with unified data management (UDM)/policy control function (PCF).

Meanwhile, during the above process, a method for identifying, by the SMF+PGW-C, whether a UE is a UE supporting 5G, is required. According to an embodiment, the UE transmits whether the UE itself supports 5G (i.e., whether the UE supports 5G NAS) through protocol control options (PCO) or extended PCO (ePCO) included in a request message, which is transmitted to the SMF-PGW-C in order to establish a PDN connection. Whether 5G is supported in the direction in which the UE performs transmission to the network in the PCO/ePCO may be added as an information element (IE) of an additional parameter list among PCOs. In order to achieve the above configuration, a container includes, as contents thereof, a container identifier indicating whether the container includes a specific IE for indicating whether the UE supports 5G, a length thereof, and information indicating whether the UE supports 5G.

The SMF/PGW-C receives information on whether the UE supports 5G through PCO/ePCO during the process of generating the PDN connection. In the case where information on whether the UE supports 5G is explicitly included, the SMF/PGW-C determines that the UE supports 5G, and if not, the SMF/PGW-C determines that the UE does not support 5G.

According to another embodiment, in the case where the UE includes parameters, which are newly added in 5G, in the PCO or ePCO of the request message, rather than the case where the UE explicitly notifies the SMF/PGW-C of whether the UE support 5G, the SMF/PGW-C determines that the UE supports 5G. When the PDU session ID, among the parameters newly added in 5G, is included in the PCO or ePCO of a message requested in order to establish a PDN connection, the SMF/PGW-C determines that the UE supports 5G, and if the PDU session ID is not included in the PCO or ePCO, the SMF/PGW-C determines that the UE does not support 5G and generates the PUD session ID by itself.

Alternatively, the UE may notify the SMF/PGW-C of whether the UE supports 5G and a 5G session management (5GSM) cause value, among parameters, which are newly added for 5G in the PCO or ePCO of a message requested in order to establish a PDN connection. That is, if the 5GSM cause value is included in the request from the UE, the SMF/PGW-C determines that the UE supports 5G, and if not, the SMF/PGW-C determines that the UE does not support 5G.

In the above embodiment, when it is determined that the UE supports only 4G, the SMF/PGW-C needs not add the newly added parameters for 5G to parameters transmitted to the UE, and 5G parameters need not be included the PCO/ePCO in the direction in which the parameters are transmitted from the network to the UE. Further, unlike the 5G UE, the 4G UE cannot generate the PDU session ID by itself, but the PDU session ID needs to be generated for the operation of the SMF/UPF. Therefore, the SMF/UPF generates a PDU session ID, instead of the UE, only in the case where the 4G UE performs access, and uses the PDU session ID for interworking with the UDM/PCF.

Figure 13:
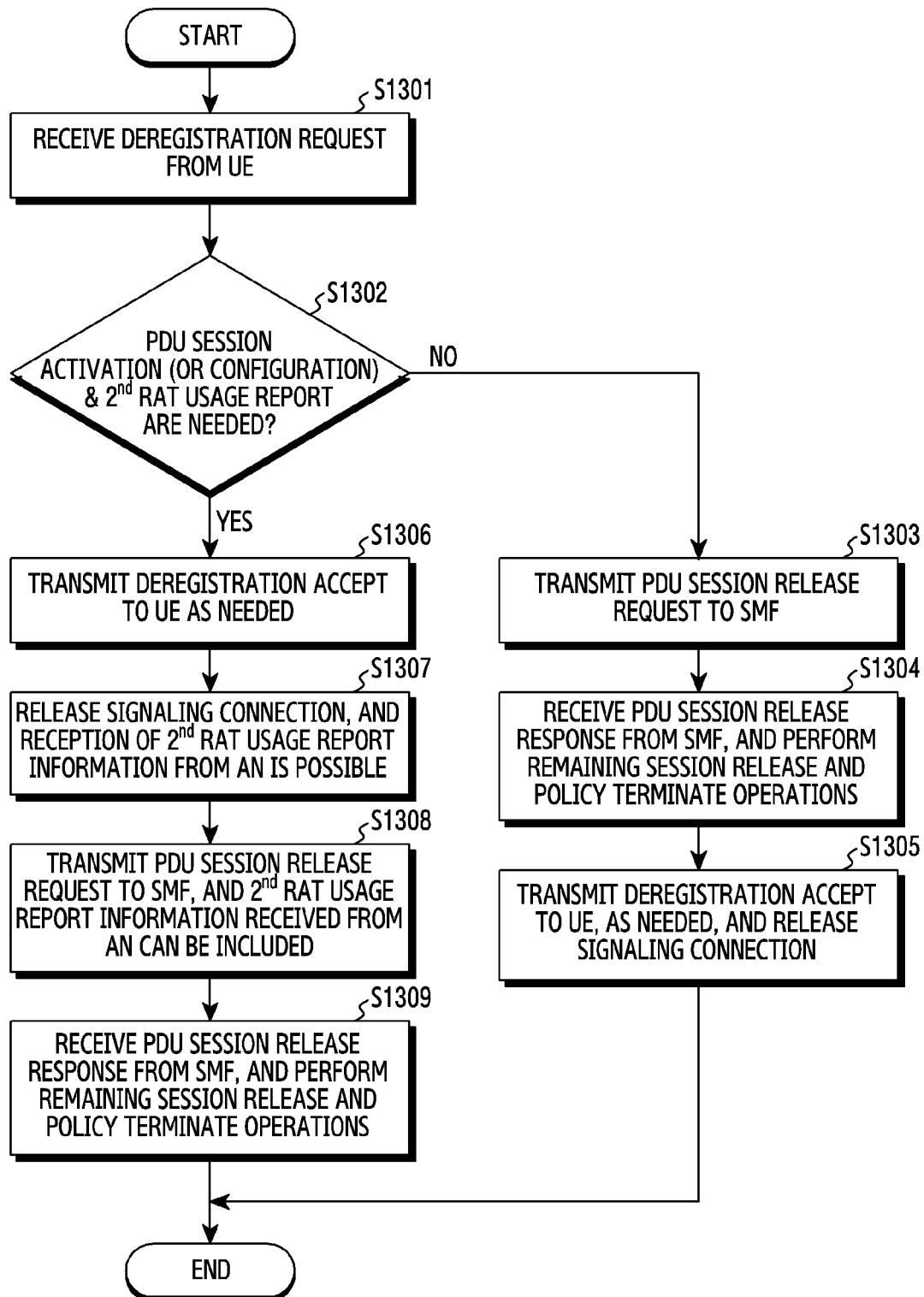
FIG. 13 illustrates an example of a process of supporting various services in a wireless communication system according to various embodiments.

FIG. 13 illustrates an example of a process of supporting various services in a wireless communication system according to various embodiments.

The embodiment of FIG. 13 may be performed by a 5G network. The embodiment of FIG. 13 may be performed by any network function (NF) configuring a 5G network. However, the embodiment of FIG. 13 mainly describes the operation of an AMF.

In operation 1301, the AMF may receive a de-registration request message from a UE. The de-registration request message includes a temporary identifier (e.g., 5G-globally unique temporary identifier (GUTI)) of the UE, a type of a deregistration request (switch-off, etc.) from the UE, or an access type to be deregistered (for example, 3GPP, Non-3GPP, or both).

In operation 1302, the AMF may determine whether there is a PDU session established for a UE which currently performs a request. Whether the PDU session is established may be determined, if the UE specifies an access type, based on whether a PDU session, which is in an established state for a corresponding access type, exists. The AMF may consider whether the PDU session, which is established for the UE having performed a request, is activated. The activation of the PDU session may denote that a resource, that is, a tunnel, is configured for the corresponding UE such that user plane data can be transmitted or received between an access node (AN) and a UPF. If there is an established or activated PDU session, the AMF may determine whether a public land mobile network (PLMN) has activated a secondary ($2^{nd}$) RAT usage report. More specifically, the AMF may determine that a condition is satisfied in the case where the PLMN performs configuration such that the $2^{nd}$ RAT usage report is applied to the established or activated PDU session.

In the following operations 1303 to 1305 or operations 1306 to 1309, only one procedure, which is selected between operations 1303 to 1305 and operations 1306 to 1309, is performed according to the determination made in operation 1302 described above. If two or more PDU sessions are established for the UE, the AMF may selectively apply operations 1303 to 1304 or operations 1306 to 1308 according to whether the $2^{nd}$ RAT usage report is applied to each PDU session.

In operation 1303, if the $2^{nd}$ RAT usage report is not needed to be applied, the AMF may transmit a message for a PDU session release request to the SMF. This process may be performed for each PDU session if a plurality of PDU sessions have been established for the UE.

In operation 1304, the AMF may receive a PDU session release response from the SMF. In addition, the remaining operations (e.g., PCF and policy termination) for PDU session release may be performed.

In operation 1305, if a response to the deregistration request, which has been received from the UE, needs to be transmitted, the AMF may transmit, in response thereto, a deregistration accept message, to the UE. In addition, the AMF may perform an operation of releasing an N2 signaling connection with a base station.

In operation 1306, if the $2^{nd}$ RAT usage report needs to be applied to the UE, the AMF may not immediately perform a procedure of releasing a PDU session together with the SMF. The AMF may transmit the deregistration accept message to the UE, as needed.

In operation 1307, if the $2^{nd}$ RAT usage report needs to be applied to the UE, the AMF may not immediately perform a procedure of releasing a PDU session together with the SMF, and may wait until a signaling connection with an access node (AN) is released. The above operation may be performed in order to receive $2^{nd}$ RAT usage data information from the AN during the operation of releasing the signaling connection with the AN, and to transmit the $2^{nd}$ RAT usage data information together with a PDU session release request to the SMF. The releasing of the signaling connection with the AN corresponds to the case where the AMF transmits an N2 UE context release request to the AN and receives a response thereto, or the case of receiving a message notifying that the UE context release has occurred from the AN.

In operation 1308, the AMF transmits a PDU session release request message to the SMF after the signaling connection with the AN is released. This process may be performed for each PDU session if multiple PDU sessions have been established for the UE. If the $2^{nd}$ RAT usage report to a target PDU session is required and the $2^{nd}$ RAT usage data information is received from the AN, the AMF may include the $2^{nd}$ RAT usage data information in a PDU session release request message (Nsmf_PDUSession_ReleaseSMContext Request).

In operation 1309, the AMF may receive a message indicating a PDU session release response from the SMF. In addition, the AMF may perform the remaining operations (e.g., PCF and policy termination) for the PDU session release.

Meanwhile, the embodiment of FIG. 13 may also be applied to the case where the 5G network deregisters the UE (i.e., NW-initiated deregistration) instead of the case where the AMF receives a request for deregistration from the UE. The case where the 5G network deregisters the UE (NW-initiated deregistration) may include at least one of cases where the AMF receives, if the subscription information of the UE is deleted, a request for deregistering the UE from the UDM, where communication with the UE is not performed until a timer inside the AMF expires, or where the UE needs to be deregistered by the intervention of the operator. When the 5G network deregisters the UE (NW-initiated deregistration), operation 1301 may not be performed in the embodiment of FIG. 13, and subsequent operations from operation 1302 may be applied after the AMF determines to deregister the UE.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating a network node in a wireless communication system, the method comprising:
   receiving, from a user equipment (UE) supporting a first radio access technology (RAT) and a second RAT, a UE-initiated deregistration request message;
   determining whether a usage reporting for the second RAT is required for a protocol data unit (PDU) session established for the UE;
   in case that the usage reporting for the second RAT is required for the PDU session, transmitting, to the UE, a deregistration accept message, and transmitting, to a radio access node (RAN) associated with the UE, a N2 UE context release request message for a signaling connection release of the RAN;
   waiting for completion of the signaling connection release of the RAN, to receive the usage reporting for the second RAT from the RAN; and
   transmitting, to a session management function (SMF), a PDU session release request message to release the PDU session.

2. The method of claim 1, further comprising:
   during completion of the signaling connection release of the RAN, receiving, from the RAN, usage data reporting for the second RAT.

3. The method of claim 1, wherein the UE-initiated deregistration request message includes at least one of 5th generation-globally unique temporary identifier (5G-GUTI), a deregistration type, or an access type to be deregistered.

4. The method of claim 1, further comprising:
   when the usage reporting for the second RAT is not required for the PDU session, transmitting, to a session management function (SMF), a PDU session release request message to release the PDU session; and
   receiving, from the SMF, a PDU session release response message.

5. A network node in a wireless communication system, the network node comprising:
   a transceiver; and
   at least one processor configured to:
      receive, from a user equipment (UE) supporting a first radio access technology (RAT) and a second RAT, a UE-initiated deregistration request message;
      determine whether a usage reporting for the second RAT is required for a protocol data unit (PDU) session established for the UES;
      in case that the usage reporting for the second RAT is required for the PDU session, transmit, to the UE, a deregistration accept message, and transmit, to a radio access node (RAN) associated with the UE, a N2 UE context release request message for a signaling connection release of the RAN;
      wait for completion of the signaling connection release of the RAN, to receive the usage reporting for the second RAT from the RAN; and
      transmit, to a session management function (SMF), a PDU session release request message to release the PDU session.

6. The network node of claim 5, wherein the at least one processor is further configured to:
   during completion of the signaling connection release of the RAN, receive, from the RAN, usage data information for the second RAT.

7. The network node of claim 5, wherein the UE-initiated deregistration request message includes at least one of 5th generation-globally unique temporary identifier (5G-GUTI), a deregistration type, or an access type to be deregistered.

8. The network node of claim 5, wherein the at least one processor is further configured to:
   when the usage reporting for the second RAT is not required for the PDU session, transmit, to a session management function (SMF), a PDU session release request message to release the PDU session.

9. The network node of claim 8, wherein the at least one processor is further configured to:
   receive, from the SMF, a PDU session release response message.

* * * * *